(12) United States Patent
Takahashi et al.

(10) Patent No.: US 11,389,840 B2
(45) Date of Patent: Jul. 19, 2022

(54) CLEANING APPARATUS FOR OPTICAL WINDOW, ENGINE, AND METHOD FOR CLEANING OPTICAL WINDOW OF ENGINE

(71) Applicant: NATIONAL INSTITUTE OF ADVANCED INDUSTRIAL SCIENCE AND TECHNOLOGY, Tokyo (JP)

(72) Inventors: Eiichi Takahashi, Tsukuba (JP); Takehiko Segawa, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 17/255,924

(22) PCT Filed: Jun. 19, 2019

(86) PCT No.: PCT/JP2019/024314
§ 371 (c)(1),
(2) Date: Dec. 23, 2020

(87) PCT Pub. No.: WO2020/004181
PCT Pub. Date: Jan. 2, 2020

(65) Prior Publication Data
US 2021/0260632 A1 Aug. 26, 2021

(30) Foreign Application Priority Data

Jun. 27, 2018 (JP) .............................. JP2018-121998

(51) Int. Cl.
*B08B 7/00* (2006.01)
*F02P 23/04* (2006.01)

(52) U.S. Cl.
CPC ............ *B08B 7/0042* (2013.01); *F02P 23/04* (2013.01)

(58) Field of Classification Search
CPC combination set(s) only.
See application file for complete search history.

(56) References Cited

U.S. PATENT DOCUMENTS

| 2011/0185786 A1* | 8/2011 | Lindner | G01N 15/10 |
| | | | 73/23.31 |
| 2017/0373474 A1 | 12/2017 | Kanehara et al. | |
| 2019/0391387 A1* | 12/2019 | Neophytou | H01J 37/3255 |

FOREIGN PATENT DOCUMENTS

| JP | H08-165978 A | 6/1996 |
| JP | 2008-002280 A | 1/2008 |
| WO | WO 2016/093214 A1 | 6/2016 |

OTHER PUBLICATIONS

Gupta, S., et al. "Lens/window-fouling mitigation in Laser ignited reciprocating", Optics and Photonics International Congress 2018, LIC5-6, Yokohama, Japan, Apr. 25-27, 2018.

(Continued)

*Primary Examiner* — Erin F Bergner
(74) *Attorney, Agent, or Firm* — Knobbe, Martens, Olson & Bear, LLP

(57) ABSTRACT

An apparatus for cleaning a surface of an optical window includes a first electrode that is provided inside the optical window and is covered with a dielectric material forming the optical window. A second electrode is provided around the optical window and is exposed on at least one surface of the optical window. A power supply is electrically coupled between the first electrode and the second electrode. The apparatus further includes a controller that controls the power supply so as to generate dielectric barrier discharge along the surface of the optical window by applying a high-frequency or pulsed voltage between the first electrode and the second electrode.

14 Claims, 7 Drawing Sheets

(56) References Cited

OTHER PUBLICATIONS

International Search report issued in Application No. PCT/JP2019/024314, dated Aug. 20, 2019.

* cited by examiner

CLEANING APPARATUS FOR OPTICAL WINDOW, ENGINE, AND METHOD FOR CLEANING OPTICAL WINDOW OF ENGINE

BACKGROUND OF THE INVENTION

Field of the Invention

The present invention relates to a technique for cleaning an optical window of an apparatus and particularly relates to a technique for cleaning the optical window of an engine ignited by a laser.

Description of the Related Art

Conventionally, an engine is operated by igniting an air-fuel mixture with a spark of a spark plug and firing the mixture, but laser ignition also has been proved possible. However, problems arise therefrom and a major problem is that a lens or an optical window for introducing a laser into a combustion chamber is contaminated with a product generated by the combustion in an engine, hence, the laser does not reach the inside of the combustion chamber with sufficient intensity, whereby ignition cannot be implemented. Solutions to the problem have been studied, in which, for example, the material of an optical window is selected to raise the temperature of the optical window or the surface of an optical window is cleaned by irradiation with a laser pulse (for example, see NPL1).

Non Patent Literature

NPL1. S. Gupta, et al. "lens/window-fouling mitigation in laser ignited reciprocating" OPTICS and PHOTONICS International Congress 2018, LIC5-6, Yokohama, Japan, 2018, Apr. 25-27

SUMMARY OF THE INVENTION

The present invention has been devised to solve the problem and provides a new and useful apparatus for cleaning an optical window, an engine, and a cleaning method.

According to an aspect of the present invention, an apparatus cleaning a surface of an optical window includes: a first electrode that is provided inside the optical window and is covered with a dielectric material forming the optical window; a second electrode that is provided around the optical window and is exposed at at least one surface of the optical window; and a power supply electrically coupled between the first electrode and the second electrode. The apparatus further includes a control unit that controls the power supply so as to generate dielectric barrier discharge along the surface of the optical window by applying a high-frequency or pulsed voltage between the first electrode and the second electrode.

According to the aspect, the power supply is controlled so as to generate dielectric barrier discharge along the surface of the optical window by applying a high-frequency or pulsed voltage between the first electrode and the second electrode. Thus, a radical and an induced airflow are generated by the dielectric barrier discharge and remove contamination on the surface of the optical window, thereby cleaning the surface.

Another aspect of the present invention provides an engine igniting an air-fuel mixture in a combustion chamber by a laser, the engine including: a laser source; an optical window made of a dielectric material and introducing a laser from the laser source into the combustion chamber; and an apparatus cleaning the surface of the optical window according to the aspect.

According to the aspect, dielectric barrier discharge is generated by the apparatus, and a radical and an induced airflow that are generated by the dielectric barrier discharge can remove contamination on the surface on the combustion chamber side of the optical window for introducing a laser. This can stably ignite an air-fuel mixture with a laser, achieving a stable engine operation.

Another aspect of the present invention provides a method of cleaning the surface of an optical window introducing a laser of an engine that ignites an air-fuel mixture in a combustion chamber by a laser, the method including controlling the power supply such that a high-frequency or pulsed voltage is applied between the first electrode and the second electrode in an exhaust stroke during an operation of the engine and dielectric barrier discharge is generated along the surface of the optical window.

According to the aspect, the power supply is controlled so as to generate dielectric barrier discharge in the exhaust stroke during an operation of the engine, so that a radical and an induced airflow that are generated by dielectric barrier discharge during an operation of the engine can remove contamination on the surface on the combustion chamber side of the optical window and intermediate species that are generated along with dielectric barrier discharge and affect combustion are discharged, achieving a stable engine operation.

DESCRIPTION OF THE PREFERRED EMBODIMENTS

Figure 1:
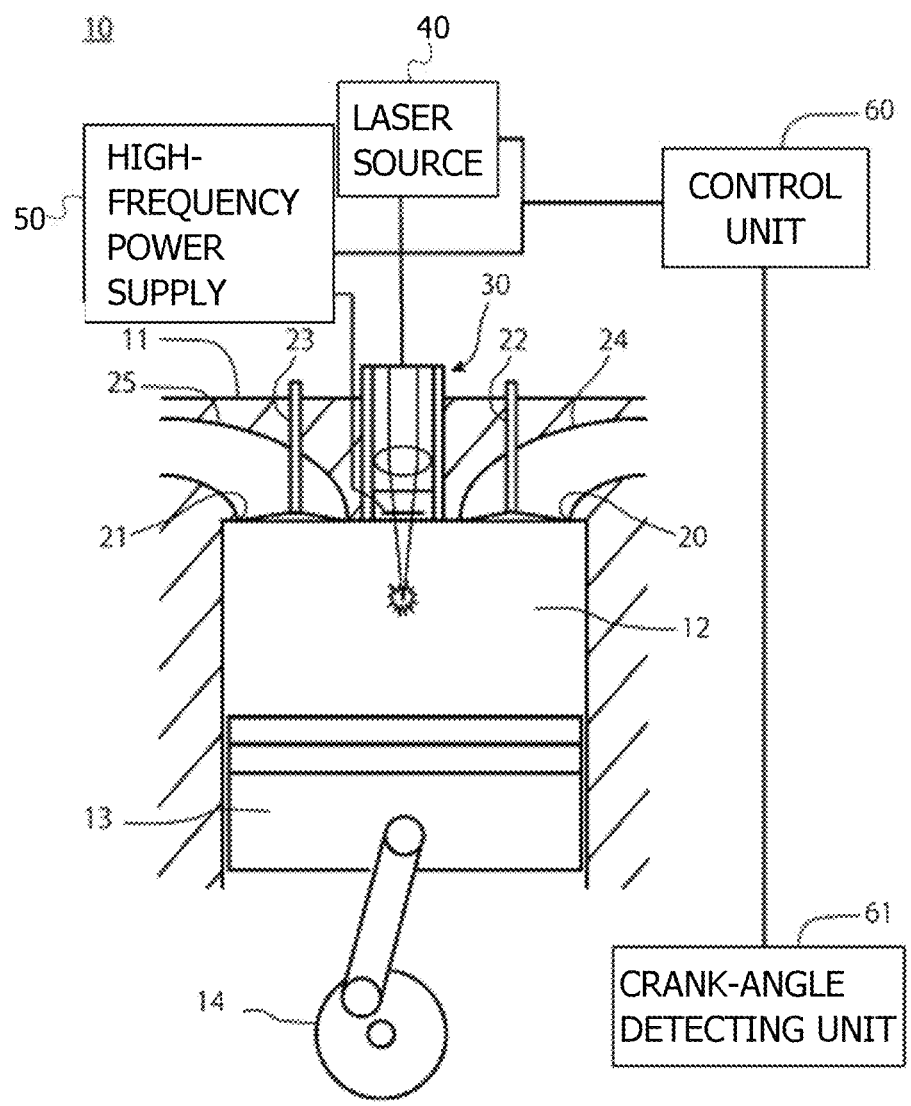
FIG. 1 illustrates the schematic configuration of an engine according to an embodiment of the present invention.

Embodiments of the present invention will be described below in accordance with the accompanying drawings.

Common elements in the drawings are indicated by the same reference numerals and a repetition of a detailed explanation of the elements is omitted.

FIG. 1 illustrates the schematic configuration of an engine according to an embodiment of the present invention.

Referring to FIG. 1, an engine 10 includes an inlet port 20, an exhaust port 21, and a laser ignition plug 30 in a cylinder head unit 11. The engine 10 further includes a laser source 40 of a pulsed laser to be introduced to the laser ignition plug 30, a high-frequency power supply 50 for supplying a high-voltage high-frequency signal to a cleaning apparatus (will be described later) for the laser ignition plug 30, and a control unit 60 for controlling the laser source 40 and the high-frequency power supply 50.

In the cylinder head unit 11, an inlet pipe 24 provided in the cylinder head unit 11 is connected to the inlet port 20. To the inlet pipe 24, a carburetor (not illustrate) for mixing vaporized fuel with air to generate an air-fuel mixture is connected. The exhaust port 21 is provided in the cylinder head unit 11 and is connected to an exhaust pipe 25. An air-fuel mixture is supplied into a combustion chamber 12 from the inlet port 20 through the inlet pipe 24 by an opening operation of an inlet valve 22 and the descent of a piston 13. The air-fuel mixture is compressed by the ascent of the piston 13 and combustion is caused by laser ignition. After the combustion, soot generated by combustion, gas of hydrocarbons, acids, aldehydes, and phenols, water vapor, and particulates are exhausted from the exhaust port 21 by the opening operation of an exhaust valve 23 and the ascent of the piston 13. At this point, soot and particulates adhere to an inner wall facing the combustion chamber 12 and the optical window of the laser ignition plug 30.

In the engine 10, an air-fuel mixture may be generated by using a port-injection method for injecting fuel into the inlet pipe 24 instead of a carburetor or an air-fuel mixture may be generated in the combustion chamber 12 by using a direct-injection method for injecting fuel into the combustion chamber 12.

Figure 2A:
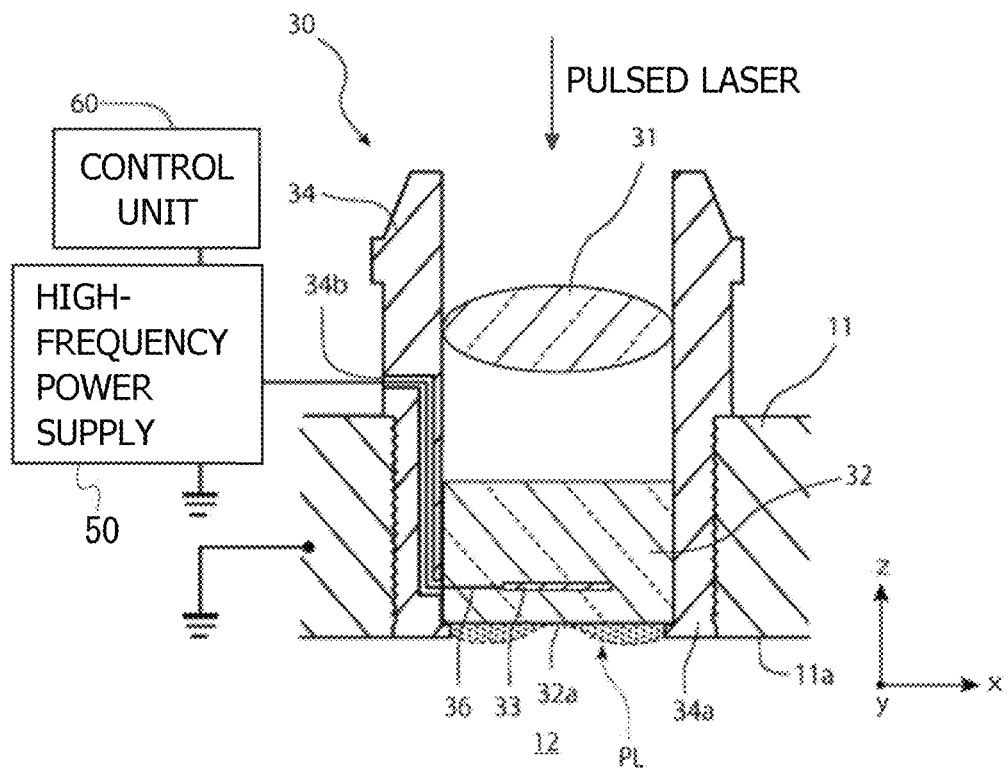
FIGS. 2A and 2B illustrate the configuration of a cleaning apparatus according to the embodiment of the present invention, FIG. 2A illustrating a cross-sectional view of the schematic configuration of a laser ignition plug, FIG. 2B illustrating a view taken from a combustion chamber.
Figure 2B:
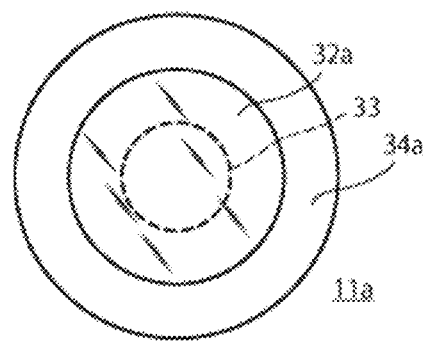

FIGS. 2A and 2B illustrate the configuration of a cleaning apparatus according to the embodiment of the present invention. FIG. 2A is a cross-sectional view illustrating the schematic configuration of the laser ignition plug. FIG. 2B is a view taken from the combustion chamber. In FIGS. 2A and 2B, some of the elements illustrated in FIG. 1 are omitted for convenience.

Referring to FIGS. 2A and 2B and FIG. 1, the laser ignition plug 30 is disposed on the cylinder head unit 11 and includes, in a support fitting 34, a condensing part 31 that condenses a pulsed laser from the laser source 40 and an optical window 32 that is exposed to the combustion chamber 12, separates the condensing part 31 from the combustion chamber 12, and allows the passage of the condensed pulsed laser. A pulsed laser is supplied from the laser source 40 and is condensed through the condensing part 31. The pulsed laser having passed through the optical window 32 ignites an air-fuel mixture in the combustion chamber 12. The timing of emission of a pulsed laser is controlled by the control unit 60 connected to the laser source 40 with signal communications. The control unit 60 acquires crank angle information from a crank-angle detecting unit 61 of a crank 14 interlocked with the piston 13. The laser source 40 can be, for example, a YAG laser but is not particularly limited. The condensing part 31 may be provided near the laser source 40.

The optical window 32 is provided with a first electrode 33 disposed in the optical window 32 and near a surface 32a adjacent to the combustion chamber 12. Around the optical window 32, a second electrode 34a is exposed to the combustion chamber 12. In the present embodiment, the second electrode 34a is a part exposed from the support fitting 34 of the laser ignition plug 30 to the combustion chamber 12. The laser ignition plug 30 is shaped like a rotating member with respect to a vertical axis in FIG. 2A (parallel to z direction in FIG. 2A).

The optical window 32 is made of a dielectric material that allows the passage of a pulsed laser. The optical window 32 preferably has heat resistance because a temperature is raised in the engine 10 by the combustion of an air-fuel mixture. The optical window 32 can be made of, for example, sapphire. The optical window 32 has a thickness of, for example, 10 mm (z direction) and has a diameter of, for example, 10 mm (x-y plane). The optical window 32 is held by the support fitting. The optical window 32 may include two members that vertically hold the first electrode 33 along z direction. For example, this configuration is preferably used if the optical window 32 is made of a material, e.g., sapphire that is hard to mold with the embedded first electrode 33.

The first electrode 33 is made of a conductive material that allows the passage of a pulsed laser. For example, the first electrode 33 can be made of a material referred to as a transparent conductive coating predominantly composed of at least one of indium oxide ($InO_2$), tin oxide ($SnO_2$), and zinc oxide ($ZnO$) or a mixed material thereof. For example, materials such as ITO ($InO_2$ doped with tin), AZO ($ZnO$ doped with aluminum (Al)), IZO (registered trademark) ($InO_2$—$ZnO$), GZO ($ZnO$ doped with gallium (Ga)), and ATO ($SnO_2$ doped with antimony (Sb)) may be used. For example, the first electrode 33 is preferably shaped like a disc with a thickness (z direction) of, e.g., 1 μm to 500 μm and a diameter (x-y plane) of, e.g., 3 mm to 30 mm and is preferably smaller than the optical window 32. The first electrode 33 is disposed at a distance of, e.g., 50 μm to 3000 μm from the surface 32a of the optical window 32 near the combustion chamber 12 and is covered with the dielectric material of the optical window 32 without being exposed to the combustion chamber 12. Sapphire is preferably used as a dielectric material of the optical window 32 of the combustion chamber 12 so as to cover the first electrode 33. The first electrode 33 is preferably disposed at the center of the optical window 32 on a plane perpendicular to the axis of an incident pulsed laser.

In the present embodiment, the second electrode 34a is an annular part exposed from the support fitting 34 of the laser ignition plug 30 to the combustion chamber and may be made of metallic materials, in particular, heat-resistant materials such as stainless steel and carbon steel. The inside diameter of the second electrode 34a is, for example, 3 mm to 30 mm and is selected according to the diameter of the optical window 32. The second electrode 34a is electrically coupled to the high-frequency power supply 50. The second electrode 34a is electrically coupled in contact with the cylinder head unit 11 and thus is preferably grounded through an engine block.

A wire 36 is connected to the first electrode 33 and is electrically coupled to the external high-frequency power supply 50 through a wire hole 34b of the optical window and the support fitting. Thus, the first electrode 33 is electrically coupled to the high-frequency power supply 50. The second electrode 34a is connected to, for example, a ground (not illustrated) via the cylinder head unit 11, and the high-frequency power supply 50 is also connected to a ground (not illustrated). The high-frequency power supply 50 is not particularly limited as long as the power supply can supply a high-frequency or pulsed high-voltage signal. The high-frequency signal is a high-frequency or pulsed signal. The frequency is preferably set at 0.05 kHz to 1000 kHz from the viewpoint of practical use in consideration of the device cost of the power supply, and the voltage is preferably set at 0.1 kV to 100 kV. The control unit 60 controls the high-voltage signal of the high-frequency power supply 50 and applies the voltage between the first electrode 33 and the second electrode 34a, generating dielectric barrier discharge PL between the surface 32a on the combustion chamber 12 side of the optical window 32, which is close to the first electrode 33, and the second electrode 34a. The wire hole 34b may be filled with an insulating material.

As described above, the cleaning apparatus according to the present embodiment includes a first electrode 33 that is provided inside the optical window 32 for introducing a pulsed laser and is covered with a dielectric material forming the optical window 32, the second electrode 34a that is provided around the optical window 32 and is exposed at a surface on the combustion chamber 12 side, and the high-frequency power supply 50 electrically coupled between the first electrode 33 and the second electrode 34a. A high-frequency or pulsed voltage is applied between the first electrode 33 and the second electrode 34a by the high-frequency power supply 50, and the dielectric barrier discharge PL is generated along the surface 32a between the second electrode 34a exposed to the combustion chamber 12 and the surface 32a close to the first electrode 33 (this processing will be also referred to as "cleaning"). The dielectric barrier discharge PL ionizes gas in the combustion chamber 12, generates radical, and generates an induced airflow. The radical reacts with contamination on the surface 32a of the optical window 32, for example, deposit or carbon and is vaporized to diffuse with an induced airflow into the combustion chamber 12, so that particulate contamination including inorganic particles is dispersed with an induced airflow from the surface 32a into the combustion chamber 12. This cleans the surface 32a of the optical window 32. The first electrode 33 is made of a material that allows the passage of a pulsed laser, thereby suppressing a reduction in the intensity of the pulsed laser.

The cleaning of the optical window 32 can be performed when an engine is stopped, that is, when the engine is not operated, for example, before the start of the engine, after the stop of the operated engine, or during an operation of the engine.

Inorganic particles on the surface 32a of the optical window 32 can be removed by an induced airflow caused by dielectric barrier discharge performed one time for a duration of 100 milliseconds, which will be proved in an effect confirmation experiment later. Thus, cleaning can be performed when the engine is stopped and cleaning can be performed to remove inorganic particles during an operation of the engine. During an operation of the engine, cleaning is preferably performed in an exhaust stroke as will be described below.

According to the effect confirmation experiment, which will be described later, it was found that a deposit or carbon on the surface 32a of the optical window 32 is more difficult to remove than inorganic particles. Thus, cleaning is preferably performed in a continuous manner for a relatively long time when the engine is stopped.

Moreover, cleaning is preferably performed in an exhaust stroke during an operation of the engine, and cleaning is more preferably repeated several times. The surface of the optical window can be cleaned during an operation of the engine by performing dielectric barrier discharge when the piston moves from the bottom dead center to the top dead center in the exhaust stroke of the engine. Additionally, intermediate species that are generated along with dielectric barrier discharge and affect combustion are discharged and left in the combustion chamber 12 during a suction stroke, thereby reducing or preventing the adverse effect of combustion in a compression stroke and a combustion stroke.

The laser ignition plug 30 is preferably flush-mounted on the surface on the combustion chamber side of the cylinder head unit so as not to project into the combustion chamber 12. This can reduce irregularities in a flow of an air-fuel mixture, the irregularities being caused by the laser ignition plug 30 shaped to be exposed to the combustion chamber 12.

According to the present embodiment, a high-frequency or pulsed voltage is applied between the first electrode 33 and the second electrode 34a by the high-frequency power supply 50, the dielectric barrier discharge PL is generated along the surface 32a of the optical window 32, and a radical and an induced airflow are generated by the dielectric barrier discharge PL and remove contamination on the surface 32a, thereby cleaning the surface 32a.

Figure 3A:
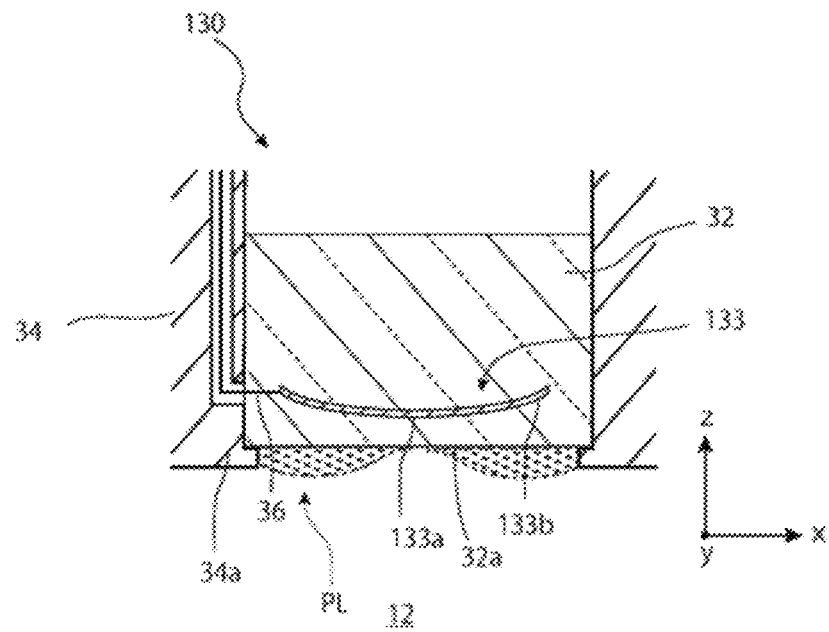
FIGS. 3A and 3B illustrate the configuration of a cleaning apparatus according to another embodiment of the present invention, FIG. 3A illustrating an enlarged cross-sectional view of the optical window of a laser ignition plug, FIG. 3B illustrating a view taken from a combustion chamber.
Figure 3B:
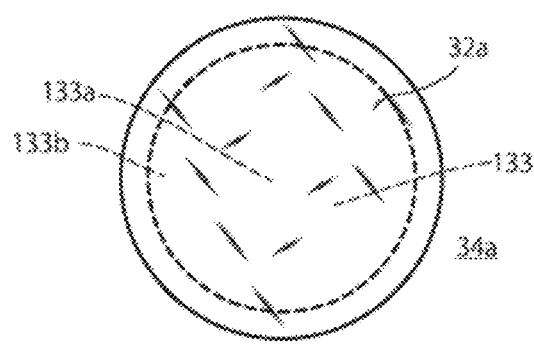

FIGS. 3A and 3B illustrate the configuration of a cleaning apparatus according to another embodiment of the present invention. FIG. 3A is an enlarged cross-sectional view of the optical window of a laser ignition plug. FIG. 3B is a view taken from a combustion chamber. Referring to FIGS. 3A and 3B, a laser ignition plug 130 is shaped such that a first electrode 133 in an optical window 32 has a central portion 133a that is closer to a surface 32a of the optical window 32 than a surrounding portion 133b on a plane (x-y plane) perpendicular to the axis of an incident pulsed laser. With this configuration, when a high-frequency voltage is applied by a high-frequency power supply 50 via a wire 36, field intensity becomes more uniform in a region opposed to the central portion 133a of the first electrode 133 and a region opposed to the surrounding portion 133b of the first electrode 133 on the surface 32a of the optical window 32 and dielectric barrier discharge PL is more uniformly generated from a portion around the surface 32a of the optical window 32 to the center of the surface 32a. This facilitates removal of contamination at the center of the surface 32a as well as the portion around the surface 32a of the optical window 32. The first electrode 133 is different in shape from the first electrode 33 of FIGS. 2A and 2B. Other configurations are similar to those of the foregoing embodiment and thus the explanation thereof is omitted.

Figure 4A:
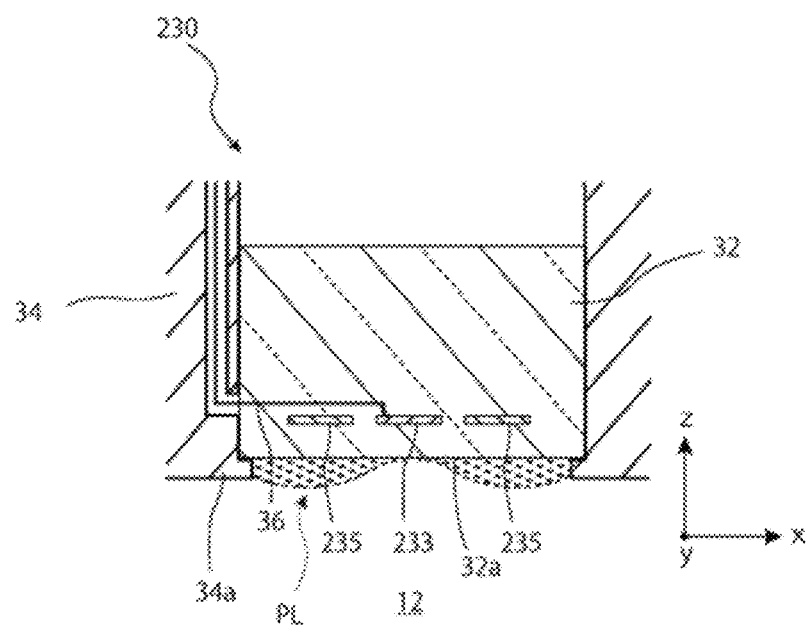
FIGS. 4A and 4B illustrate the configuration of a cleaning apparatus according to still another embodiment of the present invention, FIG. 4A illustrating an enlarged cross-sectional view of the optical window of a laser ignition plug, FIG. 4B illustrating a view taken from a combustion chamber.
Figure 4B:
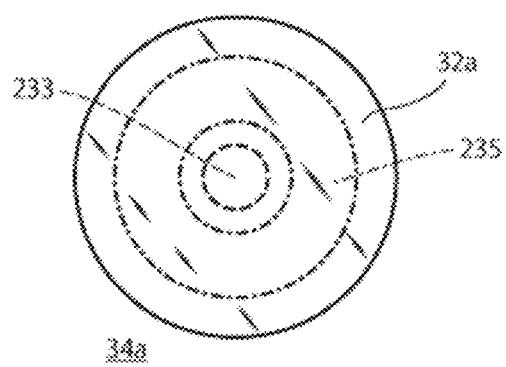

FIGS. 4A and 4B illustrate the configuration of a cleaning apparatus according to still another embodiment of the present invention. FIG. 4A is an enlarged cross-sectional view of the optical window of a laser ignition plug. FIG. 4B is a view taken from a combustion chamber. Referring to FIGS. 4A and 4B, a laser ignition plug 230 is provided with a first electrode 233 at the center and a third electrode 235 disposed around the first electrode 233 inside an optical window 32. The third electrode 235 electrically floats without being electrically coupled to the first electrode 233 and the second electrode 34a.

When a high-frequency or pulsed voltage is applied between the first electrode 233 and the second electrode 34a by the high-frequency power supply 50 illustrated in FIGS. 1, 2A and 2B, the third electrode 235 has electrostatic interaction between the first electrode 233 and the second electrode 34a. The electrically floating third electrode 235 acts as an embedded electrode in the initial period when dielectric barrier discharge grows from the second electrode 34a to the center, whereas when dielectric barrier discharge PL develops larger, the electrically floating third electrode 235 less effectively induces discharge as compared with the first electrode. This generates the dielectric barrier discharge PL from the edge to the center of the surface 32a of the optical window 32. Thus, the diameter of the first electrode 233 can be smaller than that of the first electrode 33 of the embodiment illustrated in FIGS. 2A and 2B. This encourages the expansion of the dielectric barrier discharge PL to the center of the surface 32a of the optical window 32, facilitating the removal of contamination at the center.

The effect confirmation experiment of the cleaning apparatus according to the embodiment of the present invention will be described below. In this experiment, the surface on the combustion chamber side was contaminated in simulation and dielectric barrier discharge was generated by using a dielectric barrier discharge plug (hereinafter, will be also referred to as "DBD plug").

Figure 5A:
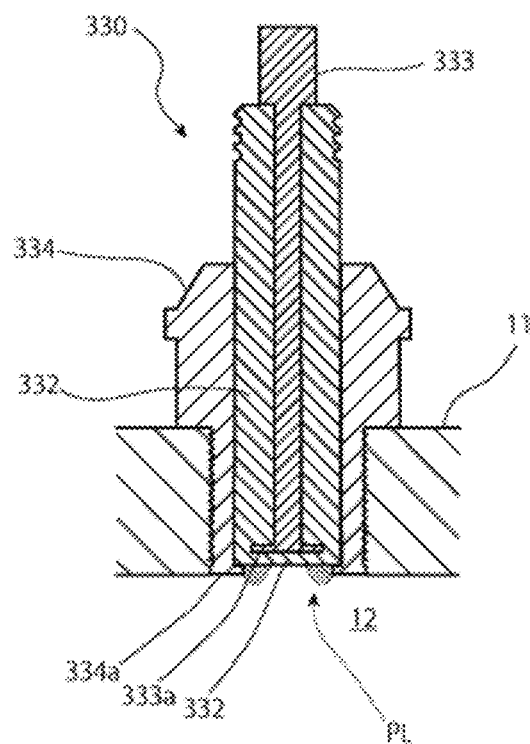
FIG. 5A is a cross-sectional view illustrating a dielectric barrier discharge plug used for an effect confirmation discharge plug and FIG. 5B is a view taken from the combustion chamber.
Figure 5B:
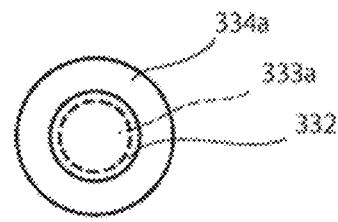

FIG. 5A is a cross-sectional view illustrating the dielectric barrier discharge plug used for the effect confirmation experiment. FIG. 5B is a view taken from the combustion chamber. Referring to FIGS. 5A and 5B with FIGS. 2A and 2B, a DBD plug 330 includes a center electrode 333a corresponding to the first electrode, a ring electrode 334a corresponding to the second electrode, and a dielectric member 332 corresponding to the optical window 32. A high-frequency voltage was applied between the center electrode 333a and the ring electrode 334a so as to generate dielectric barrier discharge on the surface of the dielectric member 332 exposed to the combustion chamber.

Effect Confirmation Experiment 1: Soot Contamination in the Combustion Chamber

Figure 6A:
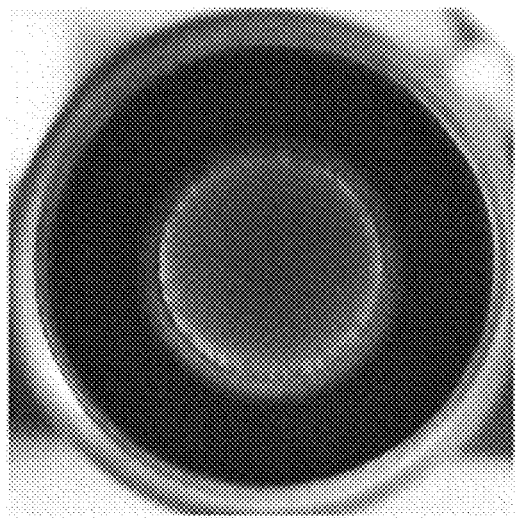
FIGS. 6A to 6C are photographs indicating changes of contamination on the surface of a dielectric member corresponding to the optical window in the effect confirmation experiment.
Figure 6B:
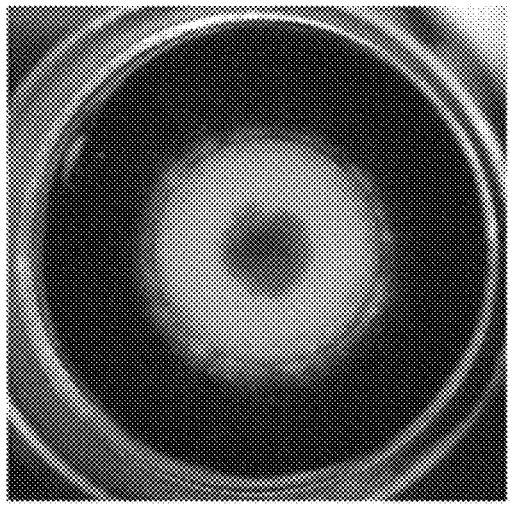
Figure 6C:
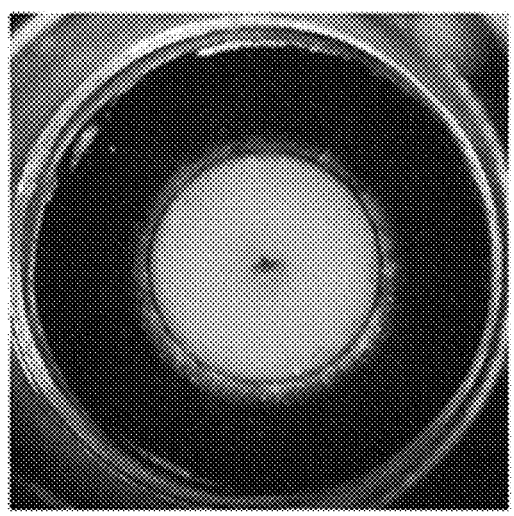

FIGS. 6A to 6C are photographs indicating changes of contamination on the surface of the dielectric member corresponding to the optical window in an effect confirmation experiment. Referring to FIGS. 6A to 6C, FIG. 6A indicates a state in which the DBD plug 330 was attached to the cylinder head unit of the engine, a conventional engine operation was performed by an ignition plug, and soot contamination was accumulated on the surface of the dielectric member 332 (corresponding to the surface 32a of the optical window 32). The darkest portion of an outer ring is the ring electrode 334a and a portion inside the ring electrode 334a is the surface of the dielectric member 332.

FIG. 6B indicates a state after a high-voltage high-frequency signal having a voltage of 10 kV and a frequency of 15 kHz was applied between the center electrode 333a and the ring electrode 334a of the DBD plug 330 for 15 seconds. In this state, a portion around the surface of the dielectric member 332, that is, a portion close to the ring electrode 334a turned white, proving that soot contamination was removed from the part.

FIG. 6C indicates a state after a high-voltage high-frequency signal with a sinusoidal wave having a voltage of 10 kV and a frequency of 15 kHz was applied between the center electrode 333a and the ring electrode 334a of the DBD plug 330 for 18 minutes, the sinusoidal wave being burst with a 20-msec width and a burst frequency of 5 Hz. FIG. 6C shows that contamination was removed substantially over the surface of the dielectric member 332.

The experiment proved that dielectric barrier discharge by the DBD plug 330 can remove soot contamination on the surface of the dielectric member 332 in the combustion chamber.

Effect Confirmation Experiment 2: Dummy Particulate Contamination

Figure 7A:
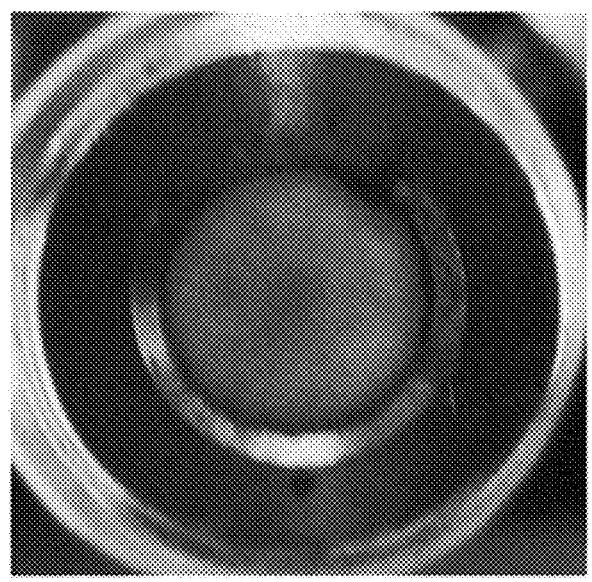
FIGS. 7A and 7B are photographs indicating changes of contamination on the surface of the dielectric member corresponding to the optical window in an effect confirmation experiment on dummy particulate contamination.
Figure 7B:
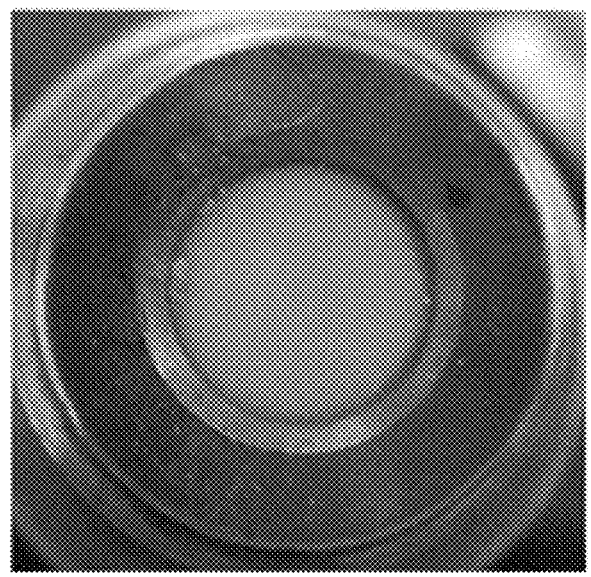

FIGS. 7A and 7B are photographs indicating changes of contamination on the surface of the dielectric member corresponding to the optical window in an effect confirmation experiment on dummy particulate contamination. Referring to FIGS. 7A and 7B, colored porous silica (mean particle diameter: several μm) was deposited on the surface of the dielectric member 332 of the DBD plug 330 as dummy particulate contamination in the combustion chamber. This state is shown in FIG. 7A. The darkest portion of an outer ring is the ring electrode 334a and a portion inside the ring electrode 334a is the surface of the dielectric member 332. Black porous silica is deposited on the surface.

FIG. 7B indicates a state after a high-voltage high-frequency signal having a voltage of 10 kV and a frequency of 15 kHz was applied between the center electrode 333a and the ring electrode 334a of the DBD plug 330 for 100 m sec. FIG. 7B shows that porous silica was removed over the surface of the dielectric member 332.

The experiment proved that dielectric barrier discharge by the DBD plug 330 can remove particulate contamination on the surface of the dielectric member 332 in the combustion chamber.

The preferred embodiments of the present invention were described in detail. The present invention is not limited to the specific embodiments and can be modified and changed in various ways within the scope of the present invention described in the scope of the claims. The laser ignition plugs 30, 130, and 230 in FIGS. 2A, 2B, 3A, 3B, 4A and 4B may include small laser sources or the condensing part 31 may be omitted.

The present invention is applicable to a gas engine in addition to the gasoline engine. Needless to say, the present invention is also applicable to a semiconductor manufacturing apparatus for introducing a laser or light with a specific wavelength into a chamber and an inspection apparatus for a semiconductor device, for example, a laser annealing device for introducing a laser onto an object and annealing the object or a device for irradiating an object in a chamber with a laser from the outside and measuring a depth and a thickness.

As an embodiment relating to the foregoing description, the following appendix is disclosed:

(Appendix 1) An apparatus cleaning a surface of an optical window of an engine that introduces a laser from the optical window and ignites an air-fuel mixture in a combustion chamber, the apparatus including:

- a first electrode covered with a dielectric material forming the optical window, inside the surface on the combustion chamber side of the optical window;
- a second electrode that is provided around the optical window and is exposed at the surface on the combustion chamber side of the optical window;
- a power supply that is electrically coupled between the first electrode and the second electrode; and
- a control unit that controls the power supply so as to generate dielectric barrier discharge along the surface on the combustion chamber side of the optical window by applying a high-frequency or pulsed voltage between the first electrode and the second electrode.

REFERENCE SIGNS LIST 10 engine
11 cylinder head unit
11a inner wall
12 combustion chamber
13 piston
20 inlet port
21 exhaust port 30, 130, 230 laser ignition plug
31 condensing part
32 optical window
32a surface of an optical window
33, 133, 233 first electrode
34 support fitting
34a second electrode
34b wire hole
36 wire
50 high-frequency power supply
60 control unit
61 crank-angle detecting unit
235 third electrode

What is claimed is:

1. An apparatus cleaning a surface of an optical window, the apparatus comprising:
a first electrode that is provided inside the optical window and is covered with a dielectric material forming the optical window;
a second electrode that is provided around the optical window and is exposed at at least one surface of the optical window;
a power supply that is electrically coupled between the first electrode and the second electrode; and
a controller that controls the power supply so as to generate dielectric barrier discharge along the at least one surface of the optical window by applying alternating voltage or pulsed voltage between the first electrode and the second electrode.

2. The apparatus according to claim 1, wherein
the optical window is disposed in an engine that is ignited by a laser,
the first electrode is disposed at an inner side of the at least one surface on a combustion chamber side of the optical window, the second electrode is disposed to be exposed to the combustion chamber, and the dielectric barrier discharge is generated along the at least one surface on the combustion chamber side of the optical window.

3. The apparatus according to claim 2, wherein the first electrode is disposed at a center of the optical window on a plane perpendicular to an axis of incidence of the laser.

4. The apparatus according to claim 3, wherein the first electrode is shaped such that a central portion thereof is closer to the at least one surface of the optical window than a portion surrounding the central portion.

5. The apparatus according to claim 1, wherein the first electrode extends in parallel with the at least one surface of the optical window.

6. The apparatus according to claim 1, further comprising a third electrode that is disposed to surround the first electrode to be inside the optical window and that is not electrically coupled to the first and second electrodes.

7. The apparatus according to claim 1, wherein the optical window is disc-shaped and the second electrode is ring-shaped to surround the optical window.

8. The apparatus according to claim 1, wherein
the optical window is formed of two optical window members disposed in a thickness direction of the optical window, and
the first electrode is interposed between the two optical window members.

9. The apparatus according to claim 1, wherein the first electrode is made of a material having, as a main component, at least one of tin oxide ($SnO_2$) and zinc oxide ($ZnO$), or a mixed material of tin oxide ($SnO_2$) and zinc oxide ($ZnO$).

10. The apparatus according to claim 1, wherein a frequency of the alternating voltage or a frequency of the pulsed voltage is set to 0.05 kHz to 1000 kHz.

11. The apparatus according to claim 1, wherein the alternating voltage or the pulsed voltage is set to 0.1 kV to 100 kV.

12. An apparatus for cleaning a surface of an optical window of an engine that introduces a laser from the optical window and ignites an air-fuel mixture in a combustion chamber, the apparatus comprising:
a first electrode covered with a dielectric material forming the optical window at an inner side of the surface on the combustion chamber side of the optical window;
a second electrode that is provided around the optical window and is exposed at the surface on the combustion chamber side of the optical window;
a power supply electrically coupled between the first electrode and the second electrode; and
a controller that controls the power supply so as to generate dielectric barrier discharge along the surface on the combustion chamber side of the optical window by applying alternating voltage or pulsed voltage between the first electrode and the second electrode.

13. An engine comprising:
the apparatus according to claim 1;
a laser source;
the optical window made of the dielectric material and introducing a laser from the laser source into the combustion chamber.

14. A method of cleaning, by the apparatus according to claim 1, a surface of an optical window introducing a laser of an engine that ignites an air-fuel mixture in a combustion chamber by using the laser,
the method comprising controlling the power supply such that the alternating voltage or the pulsed voltage is applied between the first electrode and the second electrode of the apparatus in an exhaust stroke during an operation of the engine and the dielectric barrier discharge is generated along the surface of the optical window to clean the surface of the window.

* * * * *